United States Patent [19]
Shelton

[11] Patent Number: 5,990,452
[45] Date of Patent: Nov. 23, 1999

[54] AUTOMATIC OVEN

[75] Inventor: Winston L. Shelton, Jeffersontown, Ky.

[73] Assignee: Carton Drive Enterprises LLC, Louisville, Ky.

[21] Appl. No.: 09/102,468

[22] Filed: Jun. 22, 1998

[51] Int. Cl.$^6$ ..................................................... A21B 1/02
[52] U.S. Cl. ........................ 219/393; 219/413; 219/521; 432/121; 221/150; 221/150 A; 126/190; 126/340
[58] Field of Search .............................. 99/340, 403, 468, 99/357, 388, 386, 443 C, 443 R; 126/190, 340, 19 R, 337; 211/59, 150, 386; 219/393, 413, 392, 400, 334, 335, 388, 521; 221/150 H; 222/108; 426/233, 302; 432/121, 134, 56; 392/416, 418

[56] References Cited

U.S. PATENT DOCUMENTS

| 2,387,817 | 10/1945 | Wales . |
| 2,444,510 | 7/1948 | Isserstedt . |
| 2,552,135 | 5/1951 | Bertino . |
| 3,267,835 | 8/1966 | Romano et al. . |
| 3,658,050 | 4/1972 | Snyder ..................................... 126/340 |
| 3,660,376 | 5/1972 | Grove ....................................... 219/413 |
| 3,859,903 | 1/1975 | Kipp . |
| 4,059,398 | 11/1977 | Zimmer et al. ........................... 432/121 |
| 4,398,651 | 8/1983 | Kumpfer . |
| 4,454,803 | 6/1984 | Wolf . |
| 4,513,879 | 4/1985 | Reiss ....................................... 221/150 |
| 4,784,111 | 11/1988 | Palomba .................................. 126/190 |
| 5,522,310 | 6/1996 | Black ........................................ 99/357 |
| 5,579,952 | 12/1996 | Fiedler et al. ....................... 221/150 A |

Primary Examiner—Philip H. Leung
Assistant Examiner—Leonid Fastovsky
Attorney, Agent, or Firm—Theresa Fritz Camoriano; Camoriano and Associates

[57] ABSTRACT

An oven includes a front door, a pivotable product support platform, and a back opening. There is a ramp connected to the back of the oven at the back opening, so that, when the platform pivots downwardly to eject product from the oven, the product slides down the platform and onto the ramp. The oven includes a control system, including a timer, which controls a solenoid that causes the platform to drop down when it is time to remove the product from the oven.

11 Claims, 7 Drawing Sheets

AUTOMATIC OVEN

BACKGROUND OF THE INVENTION

The present invention pertains to ovens, and, in particular, to an oven which automatically dispenses food at a predetermined time.

In fast food restaurants, there is a constant striving to efficiently prepare food that is wholesome and appealing, using workers who are not highly skilled. When preparing biscuits and other oven-cooked foods, the workers typically put the food in the oven, set a cook time and temperature, and wait for a signal to remove the food. When the worker receives the signal, he must stop what he is doing, open the oven door, and remove the food. If he does not open the door at the correct time, the product may be overcooked or undercooked.

SUMMARY OF THE INVENTION

With the present invention, the worker can put biscuits or other products into the oven, push a button, and forget about the oven. When the food has been heated for the correct amount of time, the oven automatically dispenses the food out the back, where it can be picked up by workers who are filling orders. Then, more products can be put into the oven through the front door to repeat the process.

There is no longer any need for the worker to stop what he is doing to remove products from the oven at the correct time, and the products are ready to be used to fill orders as soon as they are cooked, without the need for a worker to get them ready.

DESCRIPTION OF THE PREFERRED EMBODIMENTS

Figure 3:
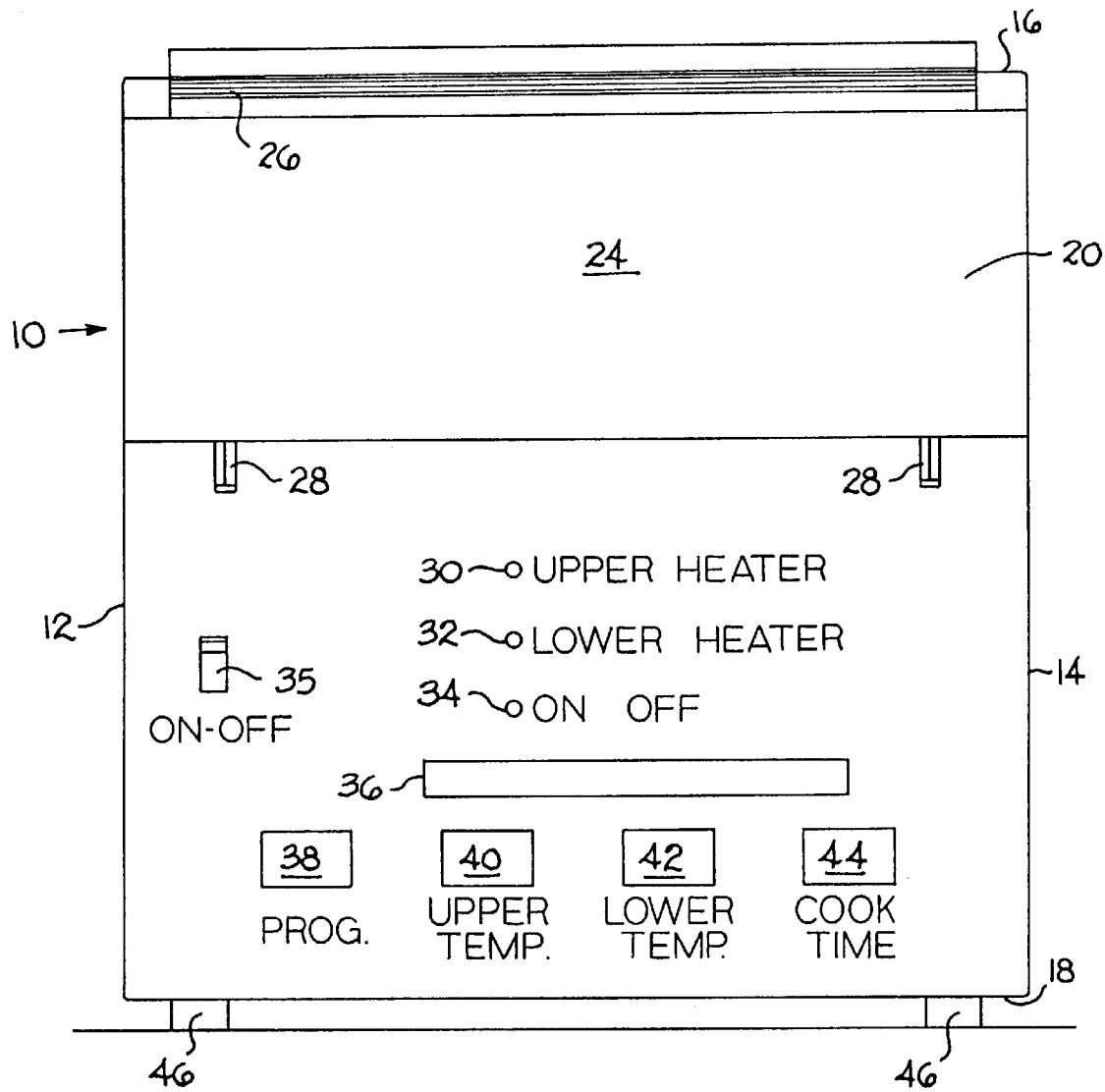
FIG. 3 is a front view of the oven of FIG. 1.

FIG. 3 shows an example of an oven 10, made in accordance with the present invention. The oven 10 defines a left side 12, a right side 14, a top 16, a bottom 18, and a front 20. (It also includes a back 22, which can be seen in FIG. 1.)

In the upper portion of the oven 10 is a front door 24, which has a handle 26, and which pivots about hinges 28. In the lower portion on the front 20 of the oven 10 are controls. Switch 35 turns the oven on and off. There are lights 30, 32, 34, which tell when the upper heating element, lower heating element, and oven are on and off. Below the lights is a display 36, which indicates various words and numbers to communicate with the person using the oven. Below the display 36 are buttons 38, 40, 42, 44 for controlling the program, the upper heater temperature, the lower heater temperature, and the cook time, respectively. At the bottom 18 of the oven 10 are four rubber feet 46, which support the oven 10 on any flat surface.

Figure 1:
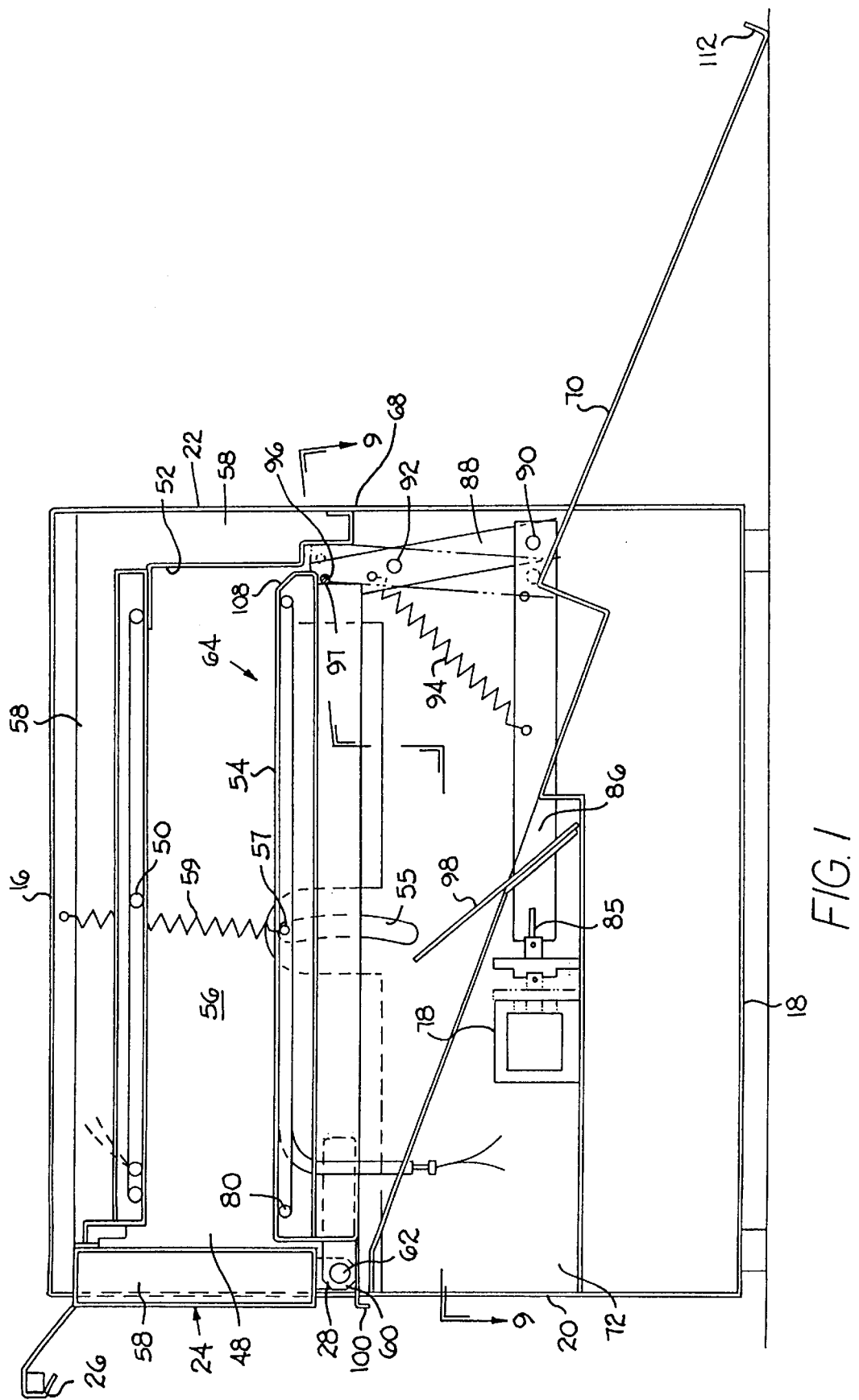
FIG. 1 is a side sectional view of a preferred embodiment of an oven made in accordance with the present invention, with the product support platform in the raised position.
Figure 2:
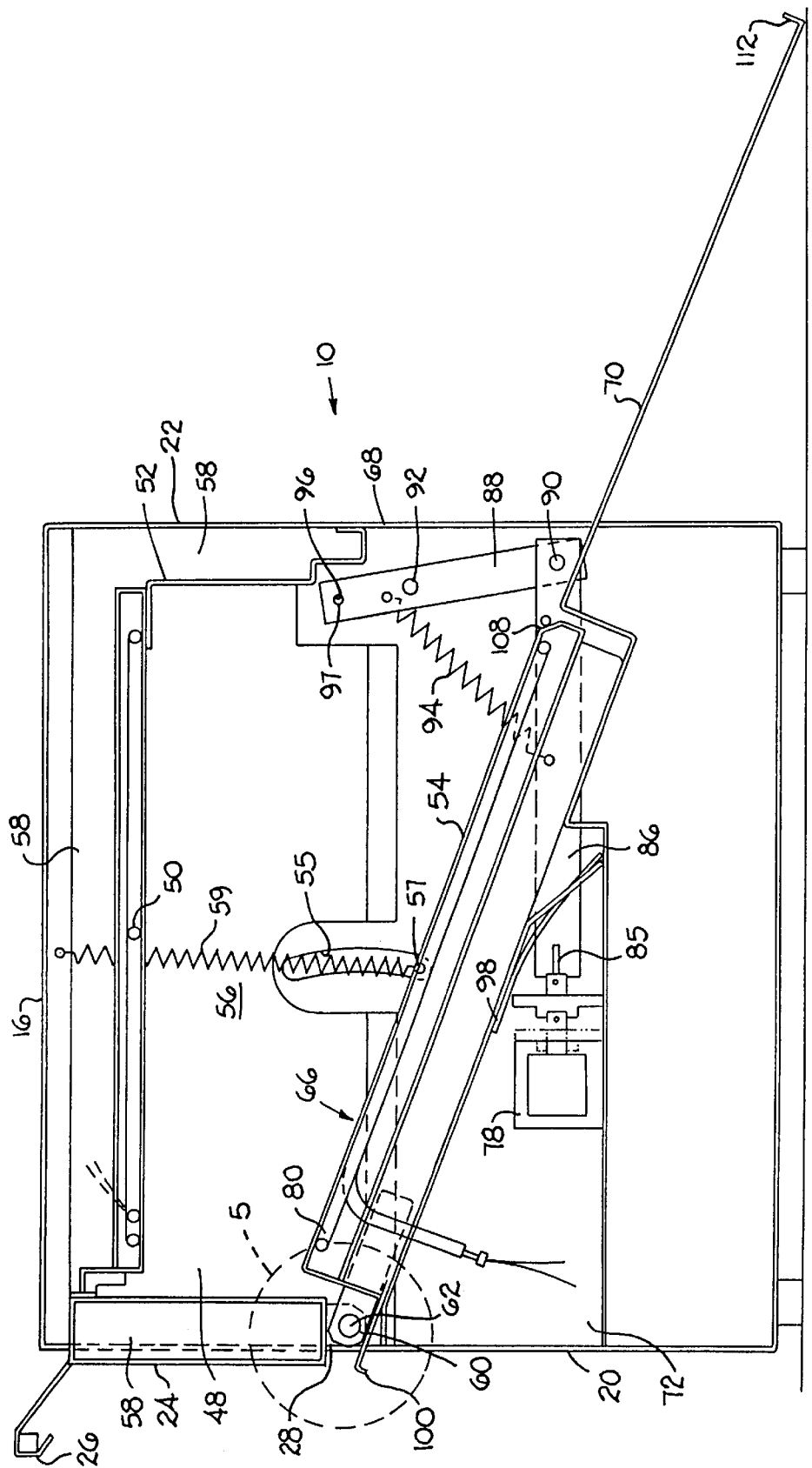
FIG. 2 is the same view as FIG. 1, but with the product support platform in the lowered position.

FIGS. 1 and 2 show the inside of the oven 10. The oven 10 includes a heating chamber 48. The front of the heating chamber 48 is defined by the front door 24. The top of the heating chamber includes an upper heating element 50. There is a back wall 52, which defines the back of the heating chamber 48. The bottom of the heating chamber is defined by a product support platform 54, when the product support platform 54 is in the raised position 64, as shown in FIG. 1. The product support platform 54 includes a lower heating element 80. In this view, we can also see the left side wall 56 of the heating chamber 48. There is insulation 58 between the back wall 52 of the heating chamber and the back 22 of the oven, between the top of the heating chamber and the top 16 of the oven, inside the front door 24, and so forth, to insulate the heating chamber 48.

The product support platform 54 is hinged to the oven 10 by a hinge 60 at the front of the oven and at the front of the product support platform. Both the hinges 28 of the front door 24 and the hinge 60 of the product support platform pivot about the same pivot axis 62. The product support platform 54 pivots from a horizontal, raised position 64, shown in FIG. 1, to a lowered position 66, shown in FIG. 2. A pin 57 extends width-wise through the product support platform 54. The free ends of the pin 57 extend beyond the product support platform 54 and through guide slots 55 in the side walls 56 of the heating chamber, which permit the pin 57 to move up and down as the product support platform 54 pivots. The guide slots 55 define an arc, the center of curvature of which is the axis 62. The free ends of the pin 57 are connected to springs 59, which are connected to the top portion of the oven 10 in order to help support the weight of the platform 54 as it is falling downwardly. The spring force required to elongate the springs 59 prevents the platform 54 from falling too rapidly.

The back 22 of the oven 10 defines a back opening 68 below the heating chamber 48, so that, when the product support platform 54 is in the lowered position 66, product will slide down the product support platform 54 and out through the back opening 68. There is a ramp 70 mounted to the oven 10 at the back opening 68, aligned with the product support platform 54 when the platform 54 is in the lowered position 66, so that the ramp 70 receives the product leaving the oven 10.

Figure 8:
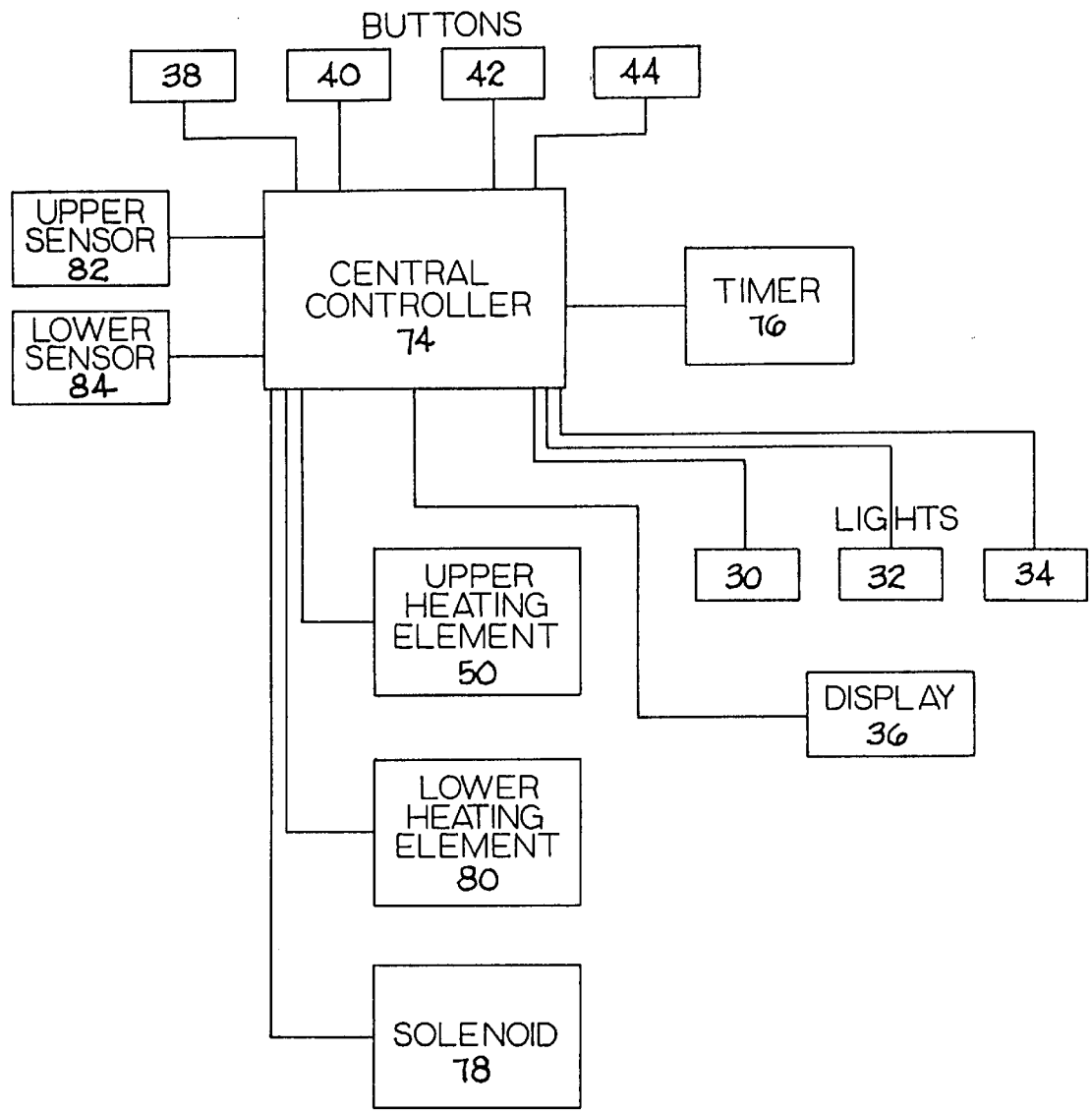
FIG. 8 is a schematic view showing the control system for the oven of FIG. 1.

A control chamber 72 is formed by sheet metal below the heating chamber 48. Inside the control chamber 72 are the electrical controls for the oven 10. The electrical controls are shown best in the schematic view of FIG. 8. The electrical controls include a central controller 74, a timer 76, and a solenoid 78. The central controller 74 communicates with the upper heating element 50, with the lower heating element 80, with an upper sensor 82 that senses the temperature of the upper heating element, with a lower sensor 84 that senses the temperature of the lower heating element, with buttons 38, 40, 42, 44, display 36, lights 30, 32, 34, and switch 35 on the front of the oven 10, and with the solenoid 78.

Figure 9:
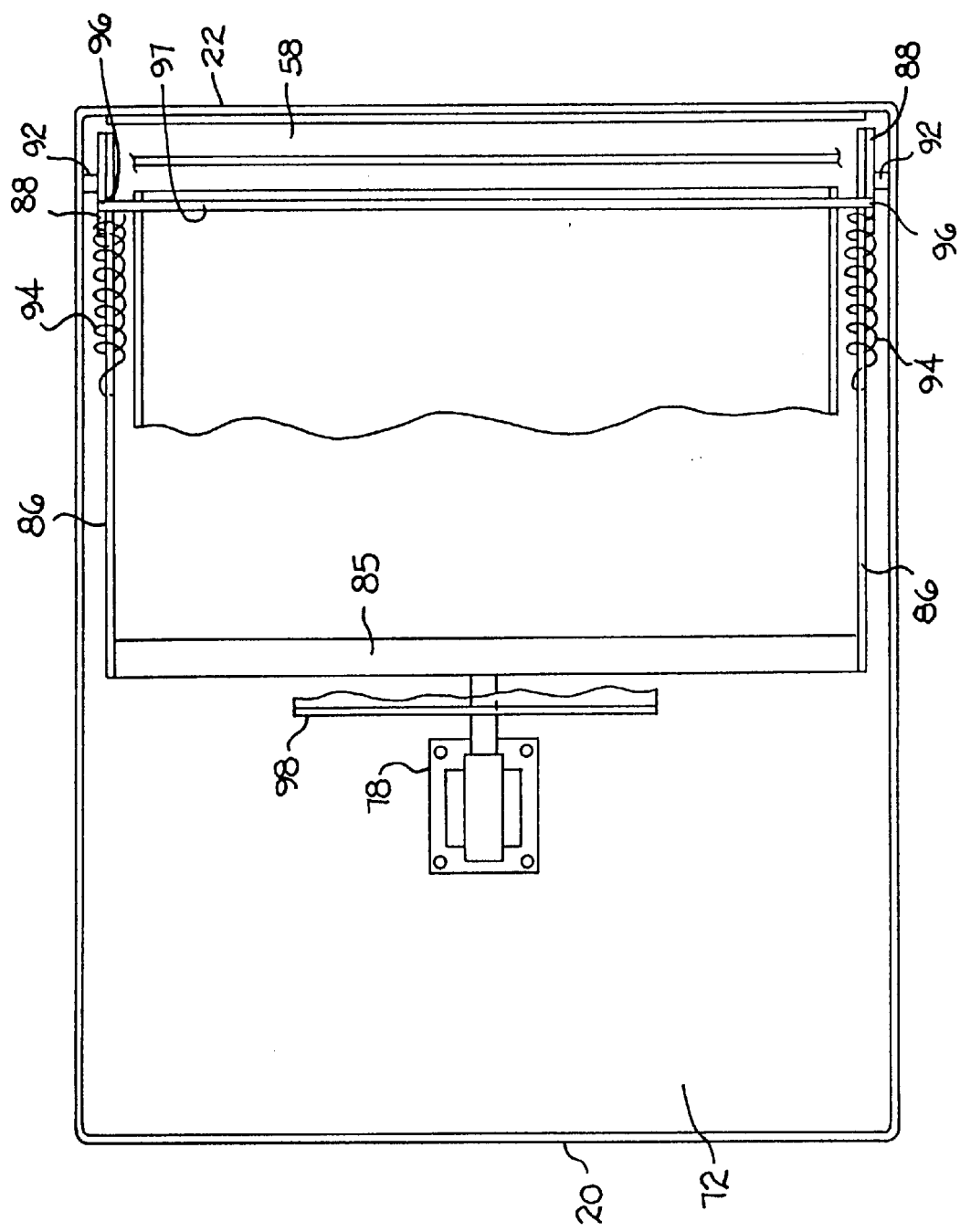
FIG. 9 is a view taken along the section 9—9 of FIG. 1.

As seen in FIG. 9, a first linkage element 85 is located in the control chamber 72 and is connected to the solenoid 78.

The first linkage element 85 is connected to a pair of second linkage elements 86, one on the left and one on the right of the oven 10, which project into the control chamber 72. Each second linkage element 86 is connected to a third linkage element 88 at a pivot point 90 (see FIG. 1). Each third linkage element 88 is mounted to the oven 10 so as to pivot about a pivot axis 92. A spring 94 is connected to each pair of second and third linkage elements 86, 88. Each third linkage element 88 includes a hole 96. A rod 97 extends between and through the holes 96. The rod 97 supports the back edge of the platform 54 in its raised position 64, as shown in FIG. 1.

When the solenoid 78 is activated to allow the platform 54 to drop, the solenoid shifts the first and second linkages 85, 86 to the left, as shown in dotted lines in FIG. 1. This causes the third linkages 88 to pivot clockwise to the position shown in dotted lines in FIG. 1, moving the rod 97 back, and thereby allowing the platform 54 to drop down to the lowered position 66, shown in FIG. 2. A flexible leaf spring element 98 is mounted on the oven below the platform 54 to cushion the fall of the platform 54, flexing as shown in FIG. 2.

The solenoid 78 automatically returns to its original position shortly after the platform 54 falls, so that, when the platform 54 is in its lowered position 66 as shown in FIG. 2, the solenoid 78 is again in its initial position, shown in solid lines.

When the platform 54 pivots downwardly to its lowered position, as shown in FIG. 2, any products on the platform 54 slide down the platform 54, out the opening 68, and onto the ramp 70. It is preferred that the products are put into the oven 10 on baking pans (not shown), which facilitate the sliding and reduce the possibility of the product sticking to the platform 54.

Figure 5:
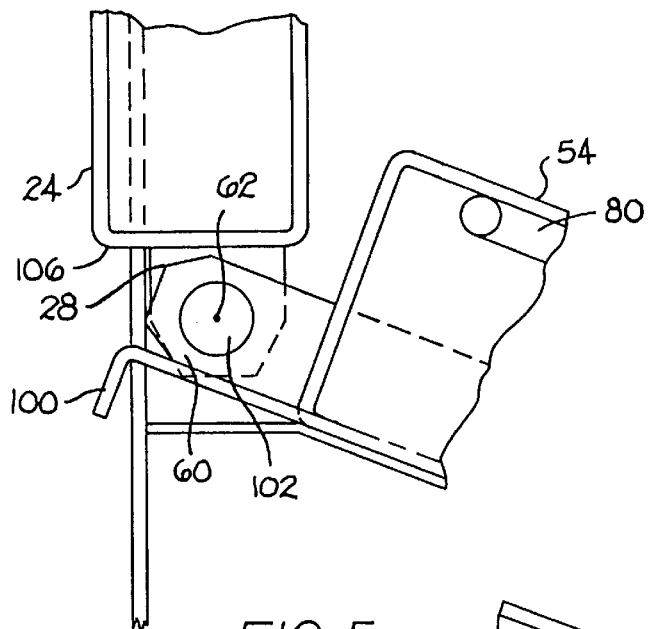
FIG. 5 is a side view of the hinge area of the oven of FIG. 2.
Figure 6:
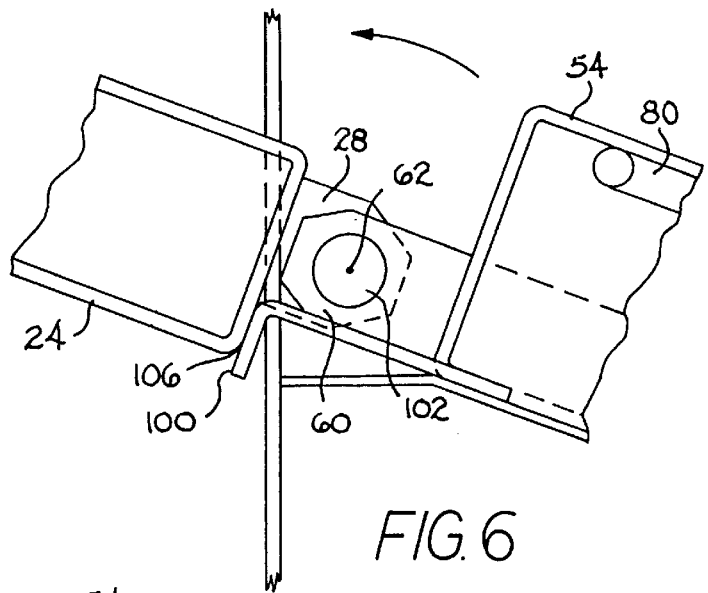
FIG. 6 shows the same hinge area as FIG. 5 as the front door is being opened.
Figure 7:
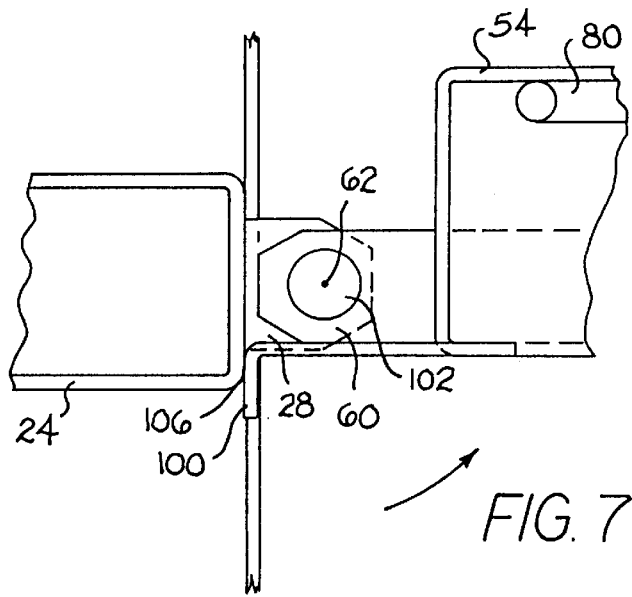
FIG. 7 shows the same hinge area as FIG. 6, as the front door is further opened, causing the product support platform to be raised.

There is a projection 100 on the front of the platform 54, as shown in FIGS. 1 and 2, which extends forward of the hinge 60. FIGS. 5–7 show how this projection 100 is used to return the platform 54 to its horizontal, raised position 64. As can be seen clearly in FIGS. 5–7, the hinges 28 of the front door 24 and the hinge 60 of the platform 54 pivot about a single rod 102, having a pivot axis 62. When the front door 24 is opened, to put more product into the heating chamber 48, the bottom surface 106 of the door 24 pivots into contact with the projection 100 on the platform 54, causing the platform 54 to pivot upwardly (counterclockwise) about the axis 62.

Looking again at FIGS. 1 and 2, it should be noted that the back of the platform 54 has a tapered edge 108. When this tapered edge 108 comes into contact with the rod 97 on the third linkages 88, it pushes the tops of the third linkages 88 back, until the platform 54 is above the rod 97, at which point the springs 94 cause the third linkages 88 to return to the position shown in solid lines in FIGS. 1 and 2, where they hold the platform 54 in its raised position 64.

Figure 4:
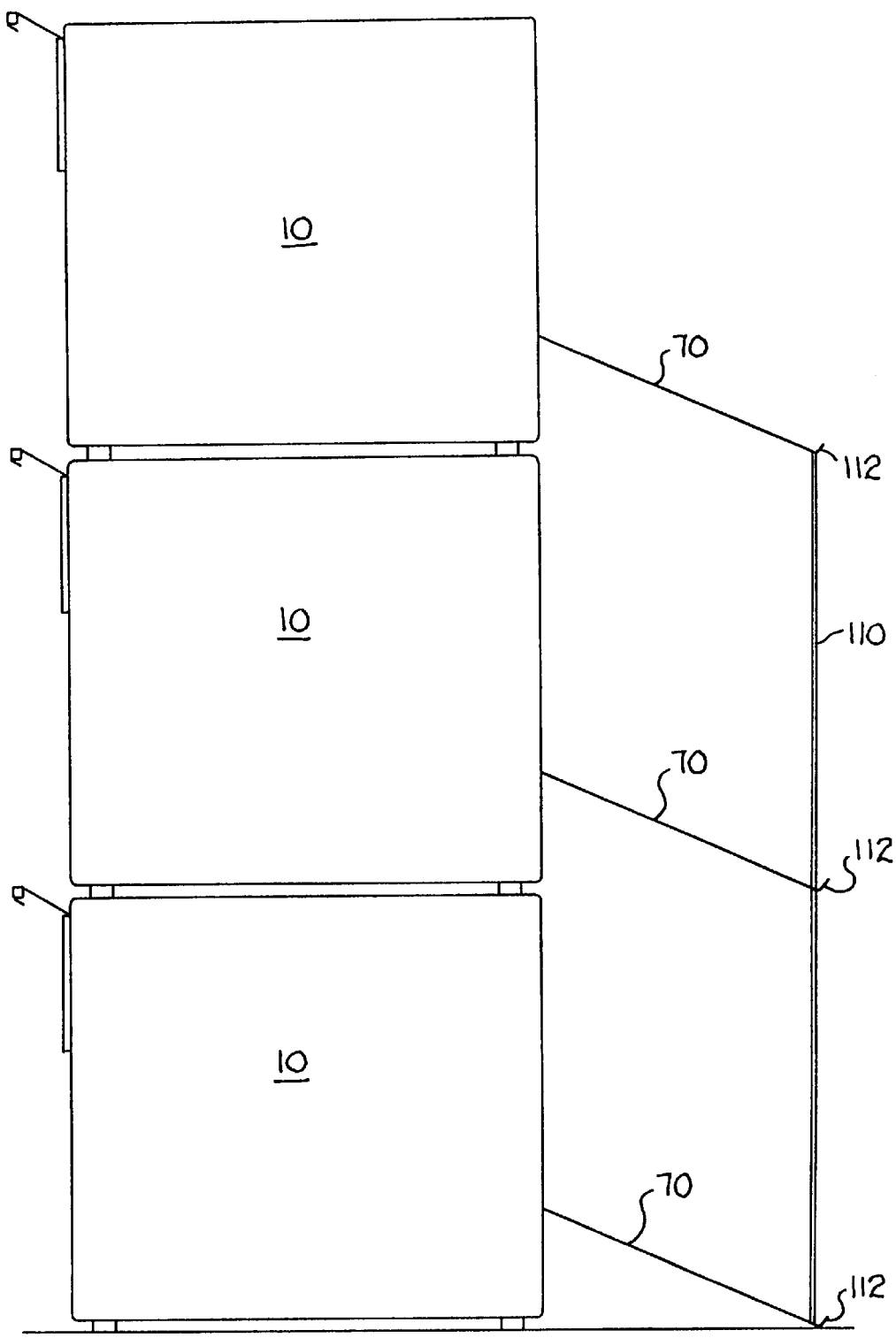
FIG. 4 is a side view showing three of the ovens of FIG. 1 stacked on top of each other.

FIG. 4 shows that the ovens 10 can be stacked on top of each other. In this arrangement, a rack 110 is provided to support the backs of the ramps 70. It should be noted that each of the ramps 70 has an upwardly-projecting lip 112, which serves to stop the pans that are sliding down the ramp 70.

What is claimed is:

1. An oven, defining a front, back, top, bottom, and left and right sides, comprising:

a heating chamber;

a front door, opening into said heating chamber;

a product support platform mounted in said heating chamber for supporting product to be heated in the oven;

a hinge mounted to the front of said oven and to the front of said product support platform, said hinge defining a pivot axis, so that said product support platform is movable about said pivot axis from a raised position, in which it can support a product being heated in the heating chamber, to a lowered position, in which it forms a downwardly-extending surface for dispensing product out the back of said oven; and a back opening in said oven below the heating chamber, through which product can pass when said product support platform is in its lowered position.

2. An oven as recited in claim 1, wherein said front door pivots about the same pivot axis as said product support platform; and further comprising a forward projection from said product support platform, which is contacted by said front door when said front door is opened, such that opening said front door causes said product support platform to pivot to the raised position.

3. An oven as recited in claim 1, and further comprising a heating element in the top of said heating chamber.

4. An oven as recited in claim 3, and further comprising a heating element in said product support platform.

5. An oven as recited in claim 1, and further comprising a ramp extending downwardly from the back opening of said oven for receiving product leaving the oven.

6. An oven as recited in claim 1, and further comprising a control chamber in said oven below said heating chamber, said control chamber including a linkage for causing said product support platform to drop to its lowered position; and a solenoid for moving the linkage.

7. An oven as recited in claim 4, and further comprising a control chamber in said oven below said heating chamber, said control chamber including a linkage for causing said product support platform to drop to its lowered position; a solenoid for moving the linkage; a temperature control for controlling said heating elements; and a timer, for controlling when the solenoid is activated to cause the product support platform to drop to its lowered position.

8. An oven, comprising:

a heating chamber, defining a front door; a product support platform; at least one heat source; a top surface, and a rear surface;

a hinge at the front of the heating chamber connected to said product support platform, so that said product support platform is pivotable from a horizontal, raised position, in which it can support products to be heated in said heating chamber, to a lowered position, in which it can dispense products out the back of said oven.

9. An oven as recited in claim 8, and further comprising a plurality of linkage members, for supporting the product platform in the raised position and for lowering the product support platform to the lowered position.

10. An oven as recited in claim 9, and further comprising an opening at the back of the oven and a ramp connected to said oven at said opening for receiving products from said product support platform.

11. An oven as recited in claim 9, and further comprising a timer, and a solenoid, wherein said timer controls said solenoid, and said solenoid controls said linkage members.

* * * * *